(12) United States Patent
Meier et al.

(10) Patent No.: US 9,336,237 B2
(45) Date of Patent: May 10, 2016

(54) CONTENT DISTRIBUTION

(71) Applicant: Rolonews LP, County Meath (IE)

(72) Inventors: Paul Meier, Worcestershire (GB); Karl Capp, West Hendred (GB); Boumediene Mourad Khelifa, Bromley (GB)

(73) Assignee: Rolonews LP (IE)

( * ) Notice: Subject to any disclaimer, the term of this patent is extended or adjusted under 35 U.S.C. 154(b) by 203 days.

(21) Appl. No.: 14/267,266

(22) Filed: May 1, 2014

(65) Prior Publication Data

US 2014/0330838 A1 Nov. 6, 2014

(30) Foreign Application Priority Data

May 2, 2013 (GB) .................................. 1307982.7

(51) Int. Cl.
*G06F 17/30* (2006.01)
*G06F 11/20* (2006.01)

(52) U.S. Cl.
CPC ...... *G06F 17/30241* (2013.01); *G06F 17/3087* (2013.01); *G06F 11/2028* (2013.01)

(58) Field of Classification Search
CPC .................... G06F 17/30241; G06F 17/30032; G06F 17/30091; G06F 17/30433
USPC .................... 707/724, 725, 743, 769; 706/12; 705/26.3
See application file for complete search history.

(56) References Cited

U.S. PATENT DOCUMENTS

| | | | | | |
|---|---|---|---|---|---|
| 2001/0051876 | A1* | 12/2001 | Seigel | ................. | G06F 17/3087 705/26.1 |
| 2007/0271246 | A1* | 11/2007 | Repasi | .............. | G06F 17/30864 |
| 2010/0076994 | A1* | 3/2010 | Soroca | .............. | G06F 17/30749 707/769 |
| 2010/0094878 | A1* | 4/2010 | Soroca | .............. | G06F 17/30035 707/748 |
| 2012/0166452 | A1 | 6/2012 | Tseng | | |
| 2012/0173373 | A1* | 7/2012 | Soroca | .............. | G06F 17/30867 705/26.3 |
| 2012/0296699 | A1* | 11/2012 | Richardson | ........ | G06Q 30/0201 705/7.31 |
| 2014/0289236 | A1* | 9/2014 | Agarwal | ........... | G06F 17/30663 707/725 |
| 2015/0234920 | A1* | 8/2015 | Tawfik | .............. | G06F 17/30864 707/724 |

OTHER PUBLICATIONS

Tolvanen et al, A structured approach to geographical information in coastal research and management, 2008, 10 pages.*
Anonymous: "How Does Calais Work? :OpenCalais", http://www.opencalais.com, Apr. 27, 2013, pp. 1-2, XP055134892, Retrieved from the Internet: URL: <http://web.archive.org/web/20130427082341/http://www.opencalais.com/about> [retrieved on Aug. 15, 2014].
Anonymous: "Linked Data—Entities : OpenCalais", Apr. 7, 2013, XP055134898, Retrieved from the Internet: URL: <http://web.archive.org/web/20130407121507/http://www.opencalais.com/documentation/linked-data-entities> [retrieved on Aug. 15, 2014].
Extended European Search Report for Application No. 14163709.0 dated Aug. 27, 2014.
Krista Thomas: "Thomson Reuters Advances on its Calais Initiative Goals : OpenCalais", Thomson Reuters Press Releases, Nov. 4, 2008, pp. 1-3, XP055134479, Retrieved from the Internet: URL: <http://www.opencalais.com/press-releases/thomson-reuters-advances-its-calais-initiative-goals> [retrieved on Aug. 12, 2014].
Abbreviated Examination Report for Application No. GB 1307982.7 dated Oct. 29, 2013.
Examination Report for Application No. GB 1307982.7 dated Feb. 24, 2014.
* cited by examiner

*Primary Examiner* — Noosha Arjomandi
(74) *Attorney, Agent, or Firm* — Lerner, David, Littenberg, Krumholz & Mentlik, LLP

(57) ABSTRACT

The distribution of content items, such as news items, is dependent in part upon the geographic relevance of the content item and the geographic community to which the target reader belongs. The geographic relevance of content items is determined and compared to a geographic profile for the reader at the distribution target. Where the function of geographic relevance exceeds a predetermined threshold, the content item is delivered to the target. As a result the reader is presented with content items that are more closely relevant to his geographic profile and desired interest threshold.

6 Claims, 8 Drawing Sheets

CONTENT DISTRIBUTION

CROSS REFERENCE TO RELATED APPLICATIONS

The present application claims the benefit of and priority to GB Application No. 1307982.7, filed May 2, 2013, the entire disclosure of which is incorporated by reference herein.

BACKGROUND OF THE INVENTION

1. Field of the Invention

The invention relates to a method and system for content distribution. In particular the invention relates to the modelling of the geographic factors in the distribution of news content.

2. Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Many content items have an interest value which corresponds to some extent with the geographical location of the content consumer. Thus when modelling the distribution of news content, news publishing platforms typically seek to characterize content as of "local" interest or of "regional" interest. In each case the driver is the need to provide timely reports that are geographically relevant to the readers of news content. These models however determine geographic relevance as a function of geographic proximity to the reader, with limited success.

In a typical scenario, a reader subscribes to a web-based news publishing service. Using a username and password to authenticate access, the reader then uses a web interface such as an internet browser application, a dedicated application (such as an "app" for a touchscreen tablet device). The web interface delivers news articles in accordance with search terms entered by the user or optionally articles selected by virtue of their novelty and/or their relevance to a known attribute of the subscriber. One attribute of a subscriber might be their location: for example a location as determined by the billing address for the subscription, a location provided by the user in response to a query, a location calculated from a satellite location system reading (e.g. GPS, Galileo, etc), or the current location inferred from the access point from the user device to the internet (i.e. WiFi access point IP address, a cell ID in a cellular radio access network).

Conventional web-based publication of news where a single location attribute is used to determine relevance can be crude, reflecting only news articles for which the article is relevant to that single location. Furthermore the user may have little control over the single location with which he is associated.

A more sophisticated method for determining geographic relevance of content is therefore desirable.

SUMMARY OF THE INVENTION

According to a first aspect of the invention there is provided a method for distributing content in accordance with geographic relevance, the method comprising: acquiring a content item; parsing the content item to extract text information and metadata, said text information including at least one named entity; obtaining contextual information associated with the named entity from a knowledge source; where said contextual information includes a geographic context, generating a spatial definition in accordance with the geographic context and appending that spatial definition to metadata associated with the content item; obtaining a profile item for a distribution target, the profile item including profile text information and profile metadata, the profile metadata including a profile spatial definition; calculating a metric of attraction between the content item spatial definition and the profile spatial definition; determining the level of relevance of the content item to the distribution target on the basis of the metric of attraction; and providing content items to the distribution target only when the level of relevance is determined to exceed a threshold level associated with the distribution target.

The method thus determines the geographic relevance of the content item, and compares this geographic relevance to a geographic profile for the reader at the distribution target. Where the function of geographic relevance exceeds a predetermined threshold the content item is delivered to the target. As a result the reader is presented with content items that are more closely relevant to his aggregate geographic profile and desired interest threshold. Readers therefore waste less time and data traffic capacity obtaining content items which are not in fact relevant to the reader. The processing capacity in distribution target devices required to present a given number of truly relevant content items is consequently reduced. In the case of a reader accessing a news aggregation service over a wireless communication link having limited bandwidth and an associated financial cost per Mb of data downloaded, such a reduction in time and data traffic is attractive.

Furthermore the interface between subscriber/reader and news aggregation service is much improved, the data delivered by the service is seen to be relevance to the reader and responsive to the reader's understanding of their true geographic community.

In accordance with a further aspect of the invention, there is provided a system for distributing content in accordance with geographic relevance, the system comprising: a memory for storing content items; communications interface which operates to transfer data between the system and at least one knowledge source and between the system and a distribution target; and a processor which in operation acquires a content item from the memory, parses the content item to extract text information and metadata, said text information including at least one named entity and obtains contextual information associated with the named entity from a knowledge source, where said contextual information includes a geographic context, the processor is arranged to generate a spatial definition in accordance with the geographic context and to append that spatial definition to metadata associated with the content item; the processor is further operable to obtain a profile item for the distribution target, the profile item including profile text information and profile metadata, the profile metadata including a profile spatial definition, to calculate a metric of attraction between the content item spatial definition and the profile spatial definition; and to determine a level of relevance of the content item to the distribution target on the basis of the metric of attraction; wherein the processor instructs the communications interface to transfer content items to the distribution target only when the level of relevance is determined to exceed a threshold level associated with the distribution target.

Various further aspects and embodiments of the invention are provided in the appended claims.

It will be appreciated that features and aspects of the invention described above in relation to the first and other aspects of the invention are equally applicable and may be combined with embodiments of the invention according to the different aspects of the invention as appropriate, and not just in the specific combinations described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
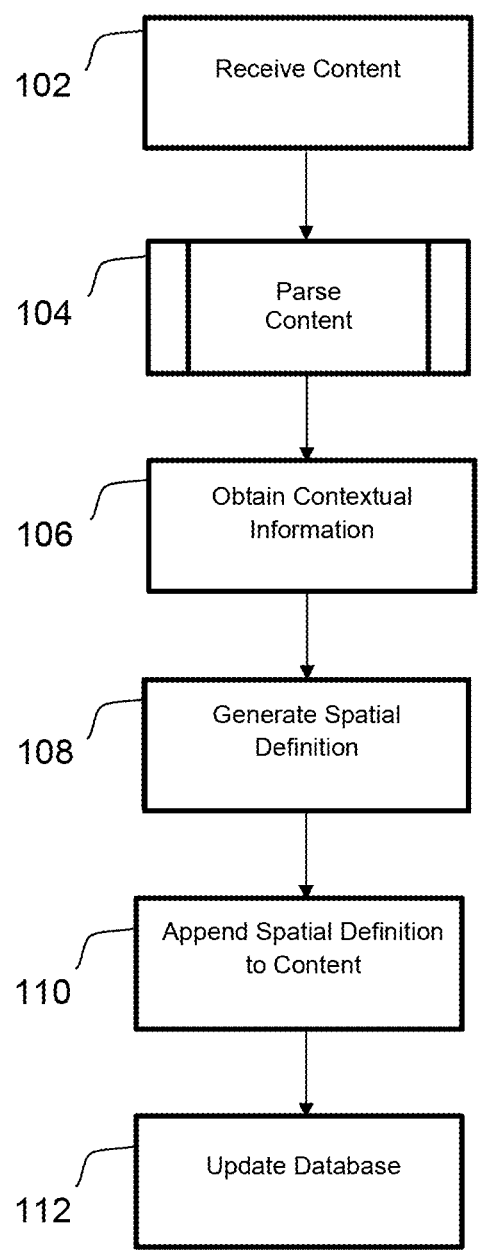
FIG. 1 illustrates the flow of operations in the preparation of a content item for distribution in accordance with an embodiment of the invention.

FIG. 1 illustrates the flow of operations in the preparation of a content item for distribution. in accordance with an embodiment of the invention. After a content item is received 102, the content is parsed 104 (this step is discussed in more detail below in relation to FIG. 3) to extract text and metadata. Where location information is included in the text, a database of contextual information is consulted and contextual information associated with the extracted location information is obtained 106. This contextual information is used to generate a spatial definition 108 that represents the location information in a form that can be used in refining further contextual information obtained and for characterising the content item geographic context. This spatial definition is appended to the content item as metadata 110. Finally, the database of contextual information may be updated to include newly generated contextual information 112.

Figure 2:
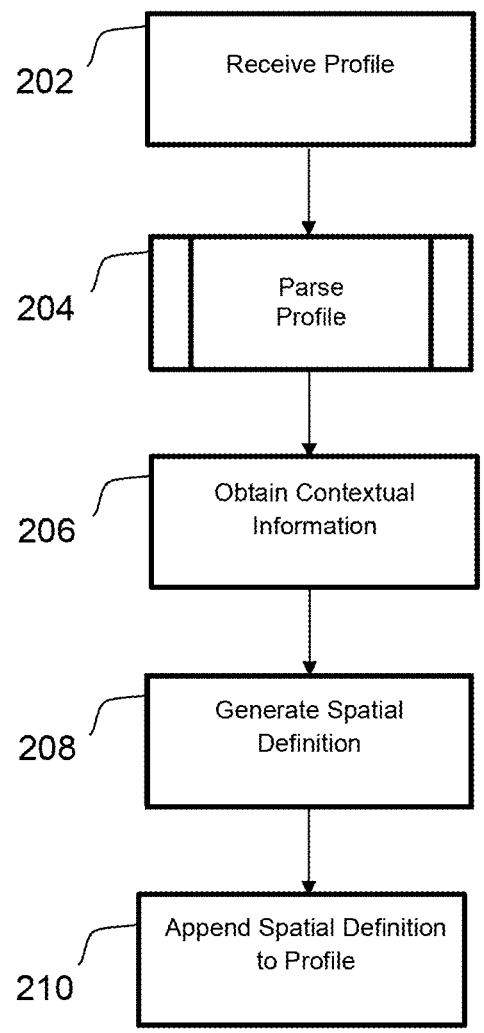
FIG. 2 illustrates the flow of operations in the preparation of a profile item corresponding to a distribution target in accordance with an embodiment of the invention.

FIG. 2 illustrates the flow of operations in the preparation of a profile item corresponding to a distribution target. By treating the profile of each distribution target (typically an individual reader or a group of users with common interests) as a dynamic content item, the profile can be represented in a manner that lends itself to comparison with the content items.

After a profile item is received 202, the profile is parsed 204 to extract text and metadata (for instance, the current location of the reader or the business premises address of the subscriber's employer). Where location information is included in the text, a database of contextual information is consulted and contextual information associated with the extracted location information is obtained 206. This contextual information is used to generate a profile spatial definition 208 that represents the profile location information in a form that can be used in refining further contextual information obtained and for characterising the geographic profile of the distribution target. This profile spatial definition is ultimately appended to the content item as metadata 210. Preferably the database of contextual information may also be updated to include any newly generated contextual information.

Figure 3:
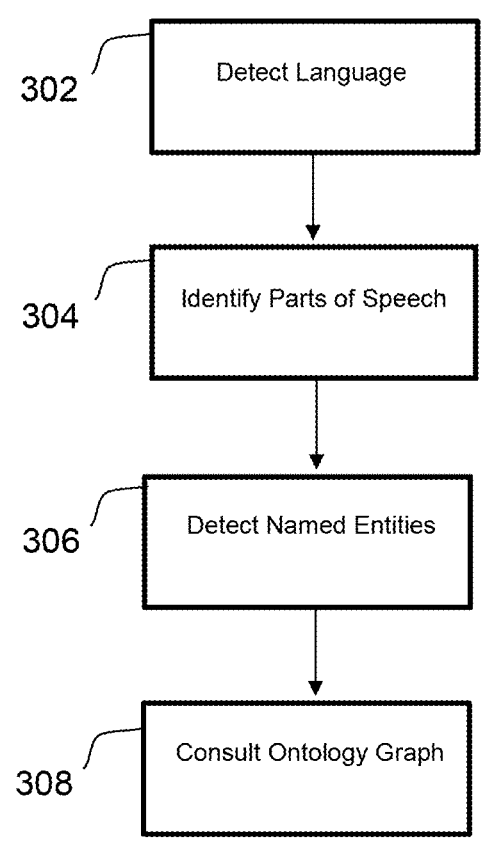
FIG. 3 illustrates the detailed flow of operations in the step of parsing textual information in FIG. 1.

The parsing of the content item 104 conventionally includes a number of steps, as illustrated in FIG. 3. Firstly, the language (or languages) used in the text may be detected 302. Using models of the detected language, parts of speech (such as nouns, verbs, adjectives etc.) are then identified 304. Named entities are detected from amongst the nouns identified in this manner 306 and these are then processed to extract meaningful terms, by referring to one or more ontology graph 308. A noun (or named entity) may relate to a nontangible concept (such as time or emotion) or to a tangible concept (such as a person, a place etc.).

Figure 4:
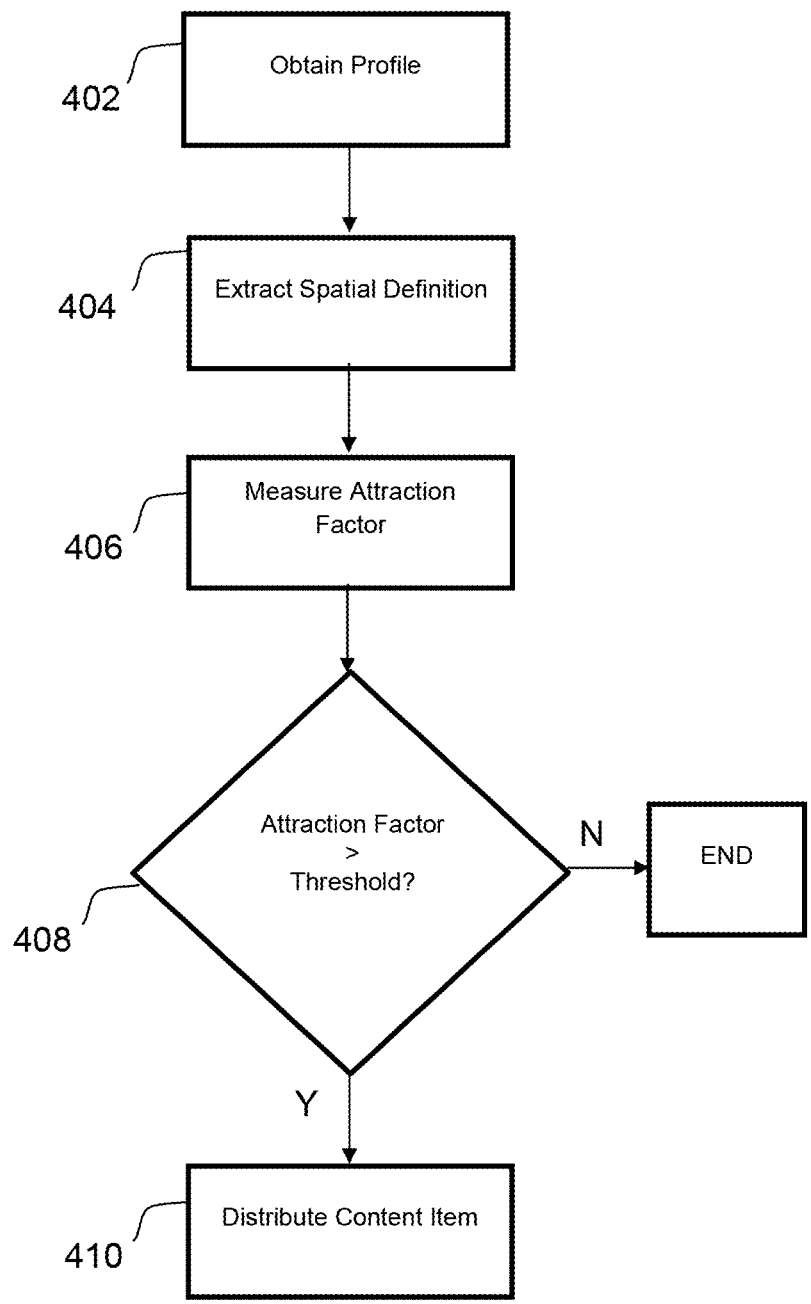
FIG. 4 illustrates the flow of events in distribution of content items in accordance with embodiments of the invention.

Distribution of content in accordance with the invention proceeds as illustrated in FIG. 4. Having obtained a profile for the distribution target 402, a spatial definition is obtained from the content item 404. As the profile spatial definition and the content item spatial definition are expressed in a common format, they can be processed to establish an attraction factor between the content and the target 406. Where the attraction factor exceeds a predetermined threshold (i.e. content items have a minimum measure of affinity to the profile) 408, the content item is accepted for distribution to the distribution target 410. Otherwise, the content item is not distributed to that target.

Figure 5:
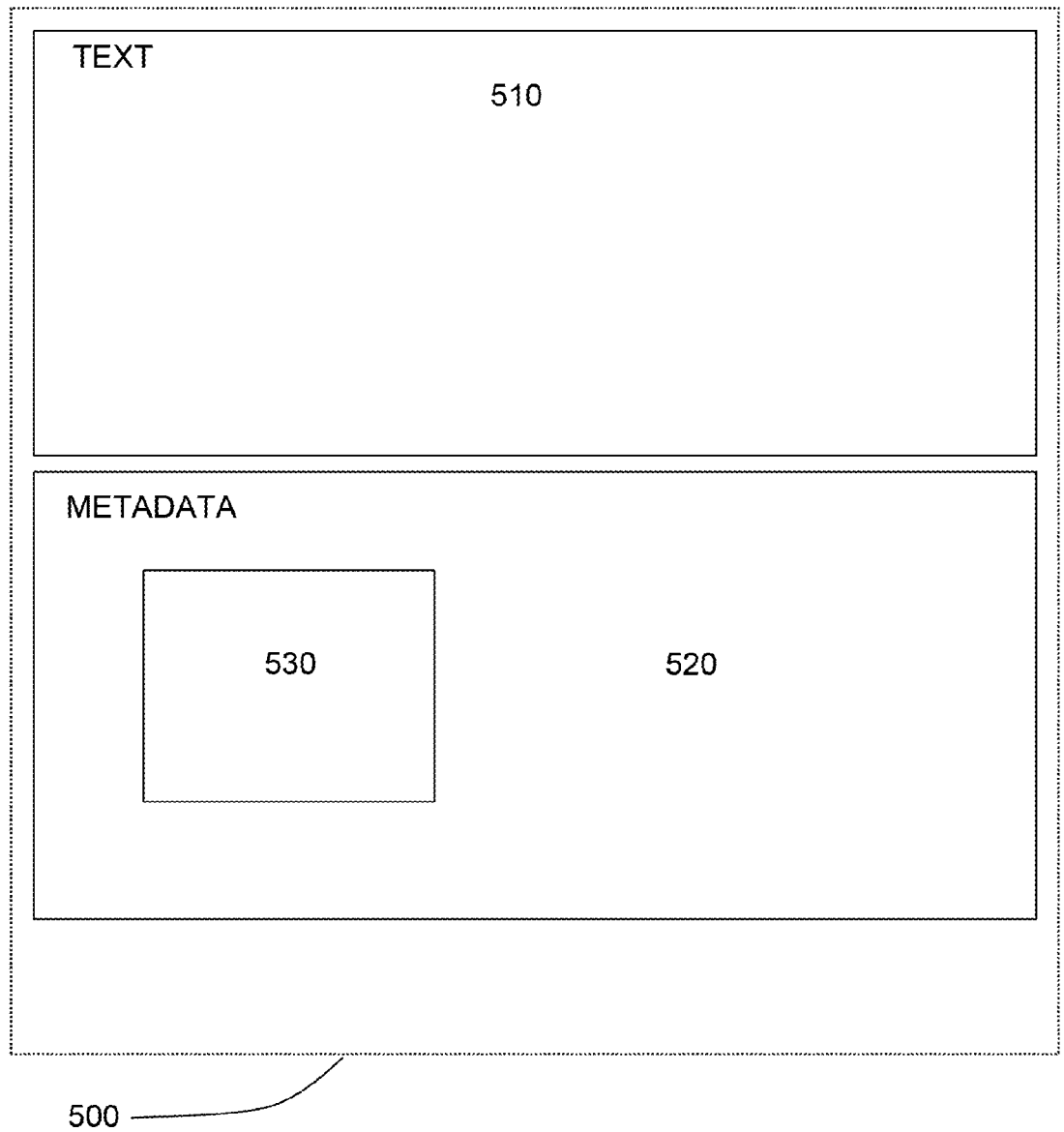
FIG. 5 illustrates features of a content item.

FIG. 5 illustrates diagrammatically the structure of a typical content item 500. The content item includes textual information 510 and metadata 520. Where the process described in respect of FIG. 1 has been applied, the metadata includes a spatial definition 530.

Figure 6:
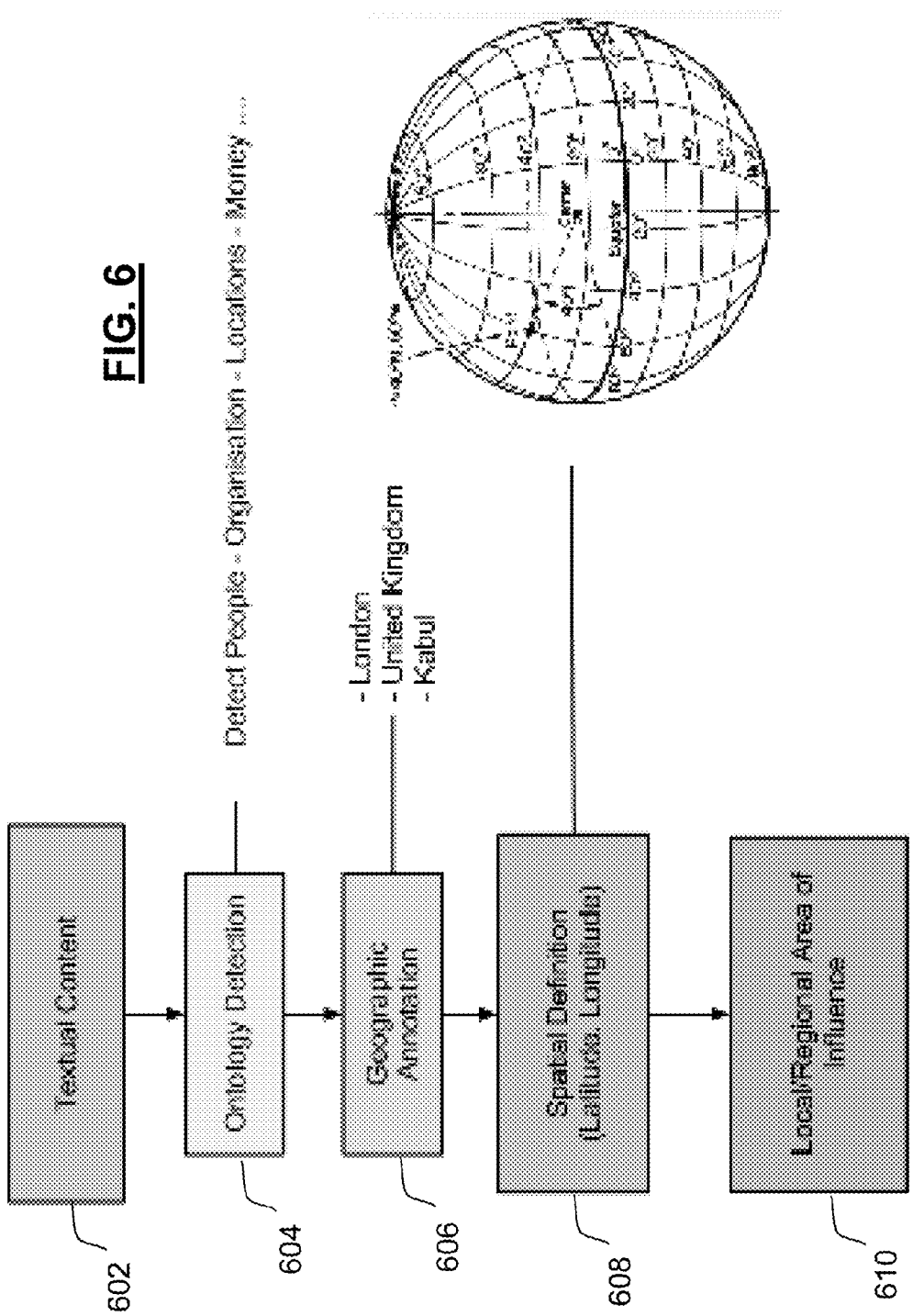
FIG. 6 provides a schematic diagram illustrating a distribution model generation method to which the method of the invention may be applied.

FIG. 6 provides a more detailed overview of the processing of a content item for use in distribution according to an embodiment of the invention.

A content item is received from a content provider (such as a publisher or news agency). Such items may be received in many different formats: typically the content item includes a text portion and a metadata portion. To construct the distribution model, the content item is scanned and parsed to extract text and any available metadata (such as data stamps, source agency, language, etc.) 602.

The parsing of the content item may include detecting the language (or languages) used in the text. Using models of the detected language, parts of speech (such as nouns, verbs, adjectives etc.) are then identified. Nouns identified in this manner are processed to extract meaningful terms. A noun (or named entity) may relate to a nontangible concept (such as time or emotion) or to a tangible concept (such as a person, a place etc.). For the purposes of extracting meaning, these named entities undergo a process referred to as ontological detection 604.

In ontological detection 604, references to the names (or job titles) of people, to the organisation or company, locations, currency, types of technology, etc. are noted and the content is annotated with metadata corresponding to these meaningful terms.

Meaningful terms are specified as ontologies: where an ontology is data construct that expresses a semantic context. Ontologies are aggregated into navigable data sources called ontology graphs which are used to represent the interrelationship between ontologies. To support the annotation of a content item with metadata corresponding to the ontologies present in the content, one or more ontology graphs (such graphs may be constructed from market data, corporate structure data, publically available encyclopaedia/dictionary data, etc.) are consulted and where a term or terms in the text of the content item are strongly associated with a given ontology in the ontology graph, the consultation returns data from the associated ontology for insertion in the metadata of the content item. Thus a term need not actually be present in the text for an ontology to be identified as an "associated ontology" and the insertion of metadata corresponding to the ontology.

Where location is specifically mentioned (i.e. a town, city or country name is amongst the metadata) or a location can be inferred (by virtue of the use of a particular currency, language, person's name etc.), this insertion of geographic annotation metadata 606 is augmented with a derived "spatial definition" 608—such as a latitude & longitude or some other co-ordinates in a geographical map. The spatial definition may in turn be used to consult further ontology graphs (e.g. knowledge databases). Thus a location term like "China" is not only referenced by the mention of the term, but also by reference to a city known to be in that country (location). Ontologies may be extracted and corresponding metadata aggregated from proprietary and/or publicly available knowledge sources such as dedicated research material, the CIA's World Factbook and Wikipedia™.

Exactly which ontologies deliver what metadata depends upon ontologies in the consulted ontology graph. A metric of likelihood is calculated on the basis of any metadata already provided in the content item. For many news content items, for example the publisher or news agency has an associated publication location which is provided as initial metadata or can be inserted for all content items from that source—thus a news item from Al Jazeera is tagged with Qatar, where the news source is based, and the metric of likelihood may be used to determine whether a news article from Al Jazeera mentioning "the Gulf" is more likely to refer to the "Gulf of Mexico" or to the "Persian Gulf".

For a content item to be of interest to a reader, it must fulfill a complex set of requirements. To attempt to represent those requirements and thereby to allow content items to be made accessible to readers whose profile would indicate a potential interest, the method of the invention generates a representation of likely aggregate reader interest by assuming that interest is in part determined by the population profile associated with the content item (for example, a news article concerning Beijing may be assumed to be of more intrinsic interest than one for a remote village with a more modest population, simply by comparing the populations of these locations). It may also be assumed that a story may achieve a level of interest by reaching a "critical mass" associated with a location that may not be defined solely by population—an article concerning the Vatican City may have a greater intrinsic interest because of the critical mass of associated ontologies. Critical mass may be considered a function of population density and population profile as well as the population size associated with the location. The population profile is itself an ontology including concepts such as demographic and statistical data concerning home ownership, purchasing power, etc.

For simplicity, the population size or critical mass is typically defined at a limited number of levels to represent a range of influence. The population size or critical mass may be large enough to represent a regional range of influence; below this, but still of some interest, the population size or critical mass may be considered to represent a local level of influence.

Level of influence is recorded for each location ontology and added to the spatial definition 610. Intuitively such levels of influence translate to geographic "circles" of relevance; where as a first approximation, distance from the latitude and longitude coordinates in a spatial definition can be used to determine whether a content item is likely to be of interest to a reader in a given location. Assuming news items are classified as being of either "regional" interest or "local" interest, respective circles of relevance are defined at different distances (ranges) from the spatial definition. Location detection serves user recommendation, and the user is the centre of this data mining and extraction process. Geographic circles need not in fact be strictly circular, they may correspond to any closed contour surrounding the latitude and longitude coordinates in the spatial definition.

If the reader's geographic profile lies within the geographic "circle" relevant to the classification of a news item (e.g. local/regional), that news item is considered relevant to the reader. In conventional systems, this would mean obtaining a reader location. There are many ways of doing this: the location may for instance be provided by the reader explicitly: the reader may access the news service through a web-based portal for which a subscriber account has been created and stored as a "cookie" for that reader. Alternatively the location may be inferred from the service provider or from signalling—for example, the WiFi location from which the reader accesses the data or more crudely the country code associated with a mobile device from which the data is accessed).

In the method of the invention, the geographic profile is a more sophisticated concept. It has been recognised that people are interested in news about their community (and not just their crudely defined location); and community is a concept that may have roots in more than one physical geographical location. If one successfully maps the geographic reach of the reader's community, one may successfully define the true geographic reach of news with respect to that reader.

Social networks clearly demonstrate that we all have a different definition of community. Thus, for example, a Chinese student from Beijing studying at the University of Manchester, is both interested in the local mayor election in Beijing, but equally interested in civic events in Manchester. This student's true geographic range of interest is no longer defined by one location or even one community, but potentially many locations and associated communities thousands of miles apart. In a conventional model, he would be pigeonholed in one or the other of the available geographical locations.

The geographic profile of a given user is thus treated as a special kind of content item. The user's tastes and community may be represented initially by a text profile provided by the user. This profile item will then be extended by the progressive addition of further metadata derived from ontologies in consulted ontology graphs. Thus the student in the above example would have a profile item that included spatial definitions for Manchester and Beijing. The profile here has two nodes each of which may be compared to (news) content item spatial definitions.

Geographical interest for a given user is therefore defined not by a simple measure of distance between a location for the reader and for the news item but rather by the determination of an "attraction factor" between spatial definitions found in the profile item and spatial definitions found in the content item metadata. The attraction factor is a function of the distance and the population size/critical mass and the type of range of influence (local or regional, say).

In the method of the invention, therefore, the reader is represented by a geographic profile that contains all these locations, and this profile periodically updated in terms of relevance and importance using his readership history. The Chinese student in the example can be considered to have geographic "presence" in both Manchester and Beijing—regardless of his/her physical location.

In the context of the invention, a geographic profile includes a spatial definition which can be compared as a weighted list of the most relevant "locales" (i.e. locations having distinct significance in the distribution model) to the spatial definition's associated with a new content item. For a user, a home address is typically the highest weighted location in the list. The user's readership history is recorded in a user track.

The geographic profile is updated with new locations as they are appear in the user's track of preferred content (for example news articles, feeds, marketing promotions etc.).

Thus the geographic profile associated with a user reading news about China will be updated with the location "China". The location gains an initial weight in the profile and the weight of that location will increment when it is referenced more often in the user track.

To ensure that locations lose importance if they no longer appear in the user track, a time decay factor may be applied to decrement the location weight.

When presenting news items that are targeted at particular clusters or populations of people rather than individuals, it assists to define additional concepts. A "Population Mass Index" represents the ability of a population in an area to form a news community. It is a function of the population number (obtained from an ontology graph in a knowledge source) and a "features vector" representing that population. A "feature vector" could be the age, market segment, educational attainment or sex of the population, for example.

In the geographic profile, a geographic area is deemed to represent a "locale" if the "Population Mass Index" for that area exceeds a predefined critical mass factor. To estimate the reach of a user's locale, the distribution model uses a "Focus Location". This location has the highest weight in their geographic profile.

Figure 7:
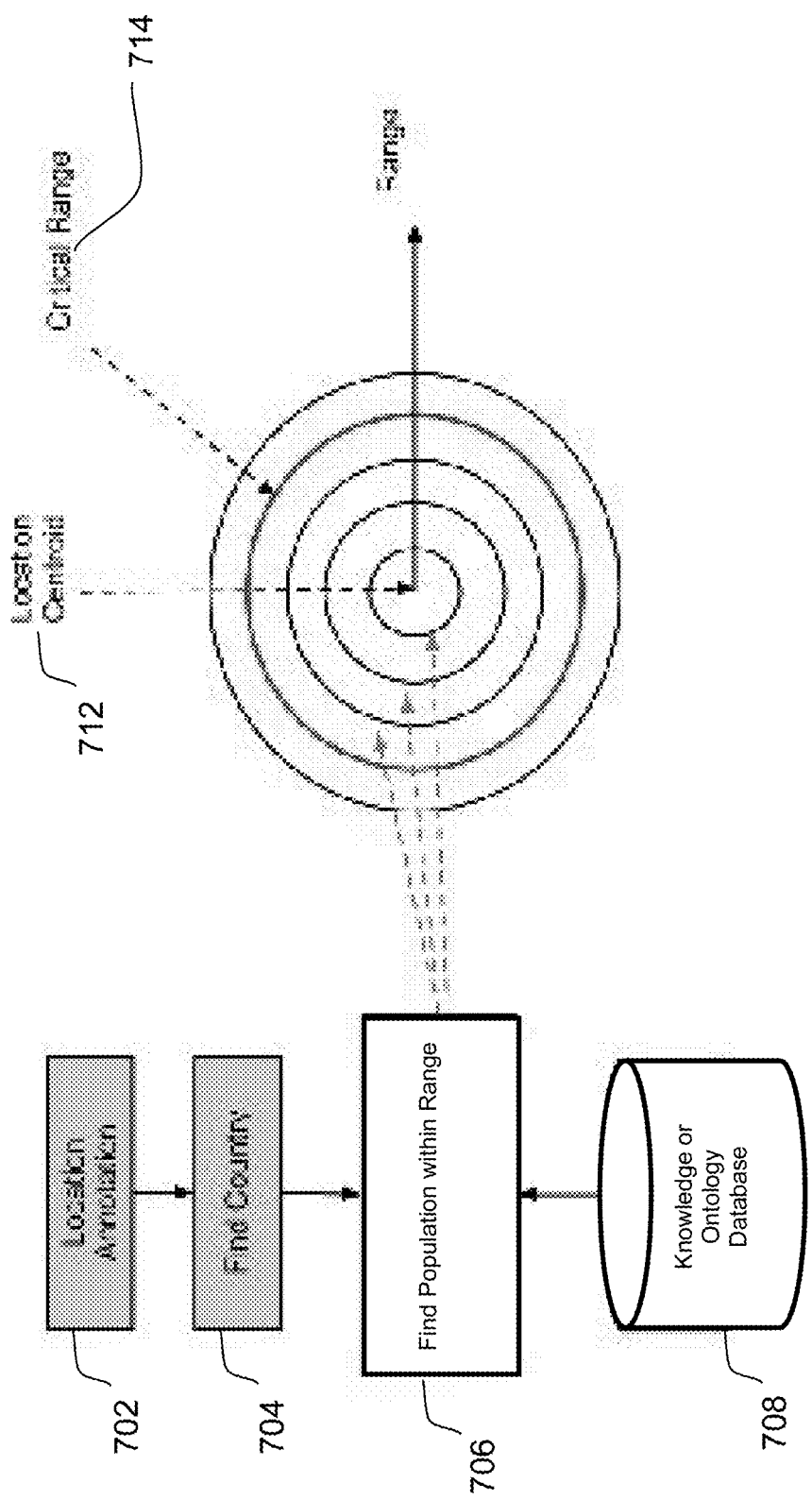
FIG. 7 provides a schematic diagram illustrating the targeting of populations of news readers for which a news article is potentially geographically relevant, the geographic relevance being determined using the method of the invention.

As illustrated in FIG. 7, the distribution model seeks to annotate the location 702 as being a local "locale" or a regional "locale" by first crudely locating the area (for example by country 704). The illustrated model then iterates radially over an area whose centroid is the "Focus Location" 712, this location being a geographical latitude/longitude pair, for example. In alternative models, the iteration refers to a non-radial expansion in accordance with a "map mesh": the map mesh may be constructed from geographic zones (such as zones having distinct telephone area codes or postal codes) or may be expressed in terms of contours that surround successively greater populations or geopolitical divides such as national, linguistic or natural boundaries. It calculates the total population number where the population satisfies the features vector 706, using contextual information extracted from a "geonames database" 708, i.e. a knowledge source. This iterative process calculates the population within successively larger ranges from the centroid 712 and is interrupted once the population number with the desired features vector reaches a critical range 714: a different threshold value being applied to "regional" or "local" locales.

In one embodiment, the "critical mass" is empirically estimated within the model. A population cluster with no specified "features vector" is determined to achieve a "Local" area of influence when the population number exceeds 50,000. A "Regional" area of influence is achieved at 5 million.

Locality is thus better estimated with this model, as geographic relevance is no longer a matter of proximity alone. A person living in Newman, Western Australia will achieve a "Local" area of influence within a 400 km range of Newman. In Oxford, UK this "Local" would be achieved within 16 km.

With this model, every location has an estimated "Local" and "Regional" range of influence. Specifying a "features vector" will further focus the relevance of a unit of information to a user's geographic profile.

Based on the user's geographic profile, and the spatial definition associated with the content item, it can be determined whether a local or regional news item should be targeted at the user.

One outcome of the application of this model is that products and services become linked to business opportunities. The same method can be used to target suitable business opportunities (or job offers or property sales etc.) towards readers whose profile indicates that these opportunities might be of interest.

Figure 8:
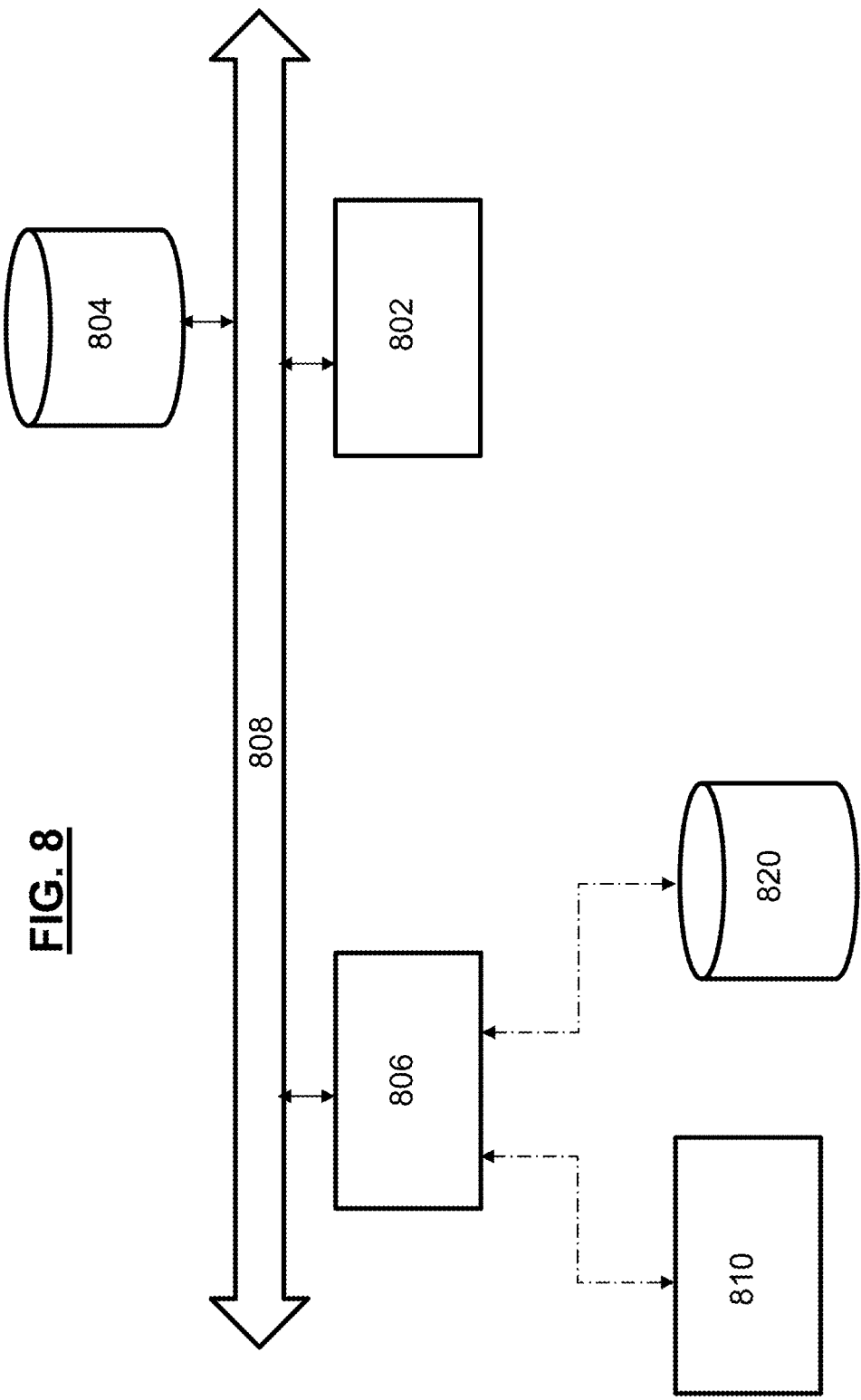
FIG. 8 illustrates the logical architecture of a computing device suitable for implementing embodiments of the invention.

In another aspect of the invention, illustrated in FIG. 8, a general purpose computer having at least one processor 802, storage means (non-volatile and/or volatile) 804, a input/output interface 806, and a bus 808 connecting the processor 802, I/O interface 806 and storage means 804. The I/O interface 806 is adapted to connect to a plurality of distribution target devices 810, such as desktop computers, laptops, touchscreen tablets, PDAs, and/or smart phones and to remote distributed knowledge sources 820, which house ontology graphs. Suitable connections may be implemented using conventional wireless and/or wired communication networks. The knowledge sources 820 may be accessed via an internet protocol link to a file server such that the knowledge source is accessible via an Internet based link such as a link to a cloud storage facility.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for distributing content in accordance with geographic relevance, the method comprising:

acquiring a content item;

parsing, by a processor, the content item to extract text information and metadata, said text information including at least one named entity;

obtaining contextual information associated with the named entity from a knowledge source;

where said contextual information includes a geographic context, generating, by the processor, a spatial definition in accordance with the geographic context and appending the spatial definition to metadata associated with the content item;

obtaining a profile item for a distribution target, the profile item including profile text information and profile metadata, the profile metadata including a profile spatial definition;

calculating, by the processor, a metric of attraction between the content item spatial definition and the profile spatial definition;

determining, by the processor, a level of relevance of the content item to the distribution target on the basis of the metric of attraction;

providing the content item to the distribution target only when the level of relevance is determined to exceed a threshold level associated with the distribution target; and tracking activity at the distribution target and updating the profile spatial definition in accordance with the tracked activity, wherein the tracked activity includes one of (i) active feedback from the distribution target indicating an evaluation of the distributed content item and (ii) passive feedback from the distribution target indicating whether the distributed content item was consumed at the distribution target.

2. The method as claimed in claim 1, wherein the profile spatial definition includes metadata corresponding to a plurality of geographic locations.

3. The method as claimed in claim 1 wherein the knowledge source is structured as an ontology graph and wherein the step of obtaining contextual information includes consulting the ontology graph to find at least one ontology for the named entity and retrieving contextual information from the ontology found.

4. A system for distributing content in accordance with geographic relevance, the system comprising:

a memory for storing content items;

a communications interface which operates to transfer data between the system and at least one knowledge source and between the system and a distribution target; and a processor which in operation acquires a content item from the memory, parses the content item to extract text information and metadata, said text information including at least one named entity and obtains contextual information associated with the named entity from a knowledge source, where said contextual information includes a geographic context, the processor is arranged to generate a spatial definition in accordance with the geographic context and to append the spatial definition to metadata associated with the content item;

the processor is further configured to obtain a profile item for the distribution target, the profile item including profile text information and profile metadata, the profile metadata including a profile spatial definition, to calculate a metric of attraction between the content item spatial definition and the profile spatial definition; and to determine a level of relevance of the content item to the distribution target on the basis of the metric of attraction;

wherein the processor is configured to instruct the communications interface to transfer content items to the distribution target only when the level of relevance is determined to exceed a threshold level associated with the distribution target; and wherein the processor is further configured to track activity at the distribution target and to update the profile spatial definition in accordance with the tracked activity, wherein the tracked activity includes one of (i) active feedback from the distribution target indicating an evaluation of the distributed content item and (ii) passive feedback from the distribution target indicating whether the distributed content item was consumed at the distribution target.

5. The system as claimed in claim 4, wherein the profile spatial definition includes metadata corresponding to a plurality of geographic locations.

6. The system as claimed in claim 4, wherein the knowledge source is structured as an ontology graph and wherein the processor obtains contextual information by consulting the ontology graph to find at least one ontology for the named entity and retrieving contextual information from the ontology found.

\* \* \* \* \*